UNITED STATES PATENT OFFICE.

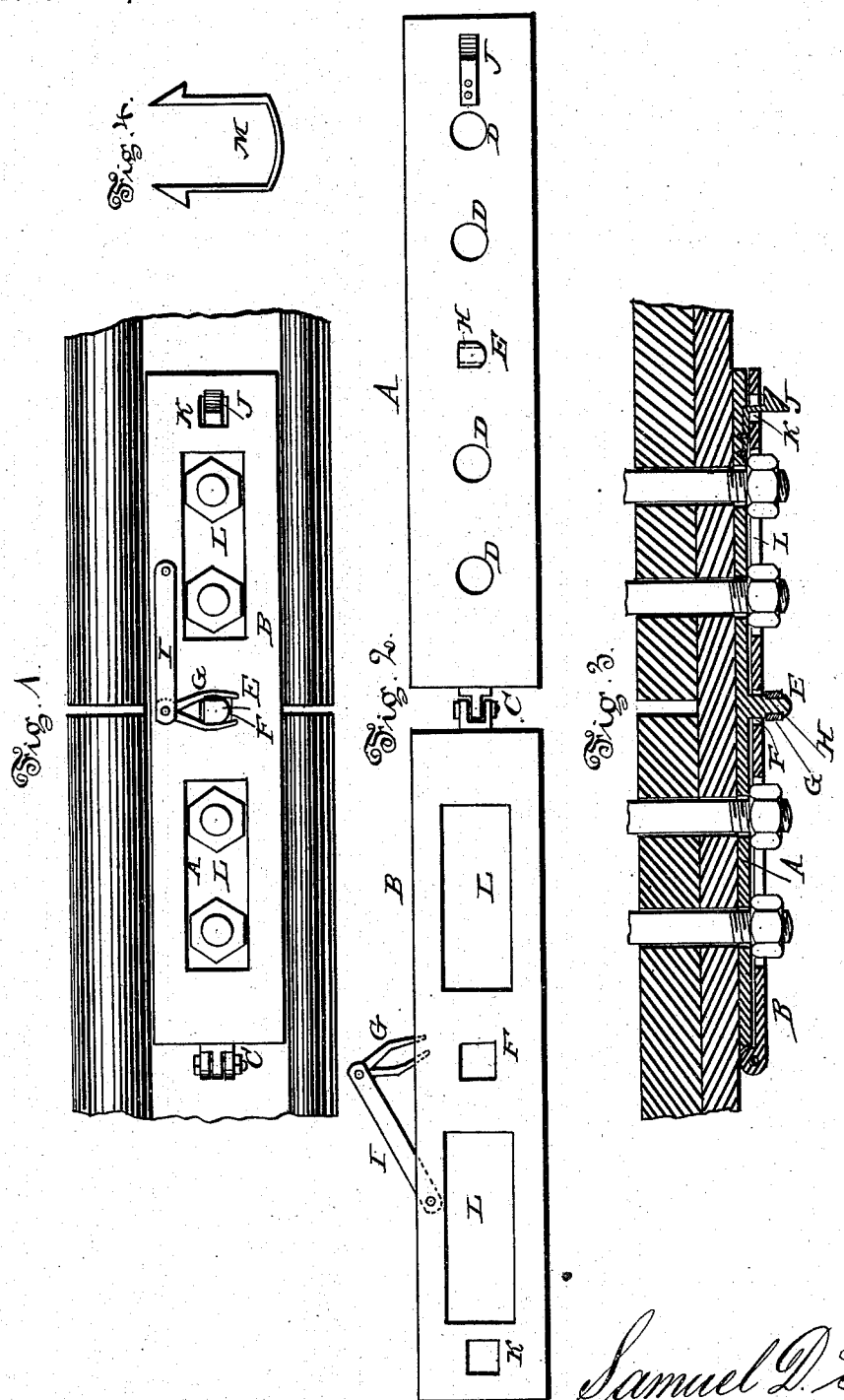

SAMUEL D. GROVES, OF SACRAMENTO, KENTUCKY.

NUT-LOCK.

SPECIFICATION forming part of Letters Patent No. 274,183, dated March 20, 1883.

Application filed January 30, 1883. (No model.)

*To all whom it may concern:*

Be it known that I, SAMUEL D. GROVES, of Sacramento, in the county of McLean and State of Kentucky, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a rail-joint provided with my improved nut-lock. Fig. 2 is a plan view of the device opened. Fig. 3 is a longitudinal horizontal section of the same, and Fig. 4 is a detail view.

Similar letters of reference indicate corresponding parts in all the figures.

My invention has relation to nut-locks; and it consists in the improved construction and combination of parts of the same, as hereinafter more fully described and claimed.

In the accompanying drawings, the letters A and B indicate two metallic plates, of a suitable length, hinged together at C. The plate A is placed upon the fish plate in a rail-joint, and upon the surface, where the screw-threaded ends of the bolts project in other cases, and is provided with holes D, corresponding to and registering with the ends of the screw-bolts which are inserted through them.

Upon the center of the plate is a projecting lug, E, which projects through a corresponding aperture, F, in the plate B, and helps to hold the plates locked when closed upon each other, a bifurcated spring, G, passing around the upper end of it, fitting into a groove, H. This spring G is fastened upon an arm, I, pivoted upon the covering-plate B, so that it may be swung upon the projecting lug and away from it.

In the outer free end of the inner plate, A, is a spring-catch, J, which engages the edge of a slot, K, in plate B, and serves, together with lug E and spring G, to keep the plates locked.

L L are longitudinal slots in the outer plate, which fit over two sides of the nuts, when they are screwed upon the bolts against plate A, and prevent them from turning.

If desired, the double spring-catch M, as shown in Fig. 4, may be used, instead of lug E, to lock the plates together, and it will be seen that the plates may be made of any size, so as to fit any number of nuts.

It will also be seen that the outer plate will perfectly protect the nuts and the ends of the bolts from damage or injury from outside, and that by locking the plates together tampering from outside is prevented.

Having thus described my invention, I claim and desire to secure by Letters Patent of the United States—

In a nut-lock, the combination of plate A, having holes D, projecting lug E, having groove H, and spring-catch J, with the plate B, hinged to plate A at C, and having slots F, K, and L, and arm I, provided with bifurcated spring G, as shown and set forth.

In testimony that I claim the foregoing as my own I have hereunto affixed my signature in presence of two witnesses.

SAMUEL D. GROVES.

Witnesses:
GEORGE G. FRAZIER,
JACOB J. GROVES.